United States Patent
MacDonald et al.

(10) Patent No.: US 8,425,284 B2
(45) Date of Patent: Apr. 23, 2013

(54) HEATING VENTILATION AND AIR CONDITIONING CASE WITH HONEYCOMB

(75) Inventors: Robert MacDonald, White Lake, MI (US); Shawn Westergaard, Sterling Heights, MI (US); Ercole Santilli, Sterling Heights, MI (US); Stephen Sinadinos, Commerce Township, MI (US); Gerald DeVries, Bloomfield Hills, MI (US)

(73) Assignee: DENSO International America, Inc., Southfield, MI (US)

(*) Notice: Subject to any disclaimer, the term of this patent is extended or adjusted under 35 U.S.C. 154(b) by 1064 days.

(21) Appl. No.: 12/411,164

(22) Filed: Mar. 25, 2009

(65) Prior Publication Data

US 2010/0248607 A1     Sep. 30, 2010

(51) Int. Cl.
B60H 1/00   (2006.01)
B60H 1/26   (2006.01)
F24F 7/08   (2006.01)
F24F 7/007  (2006.01)

(52) U.S. Cl.
USPC .......................... 454/143; 454/139; 454/338

(58) Field of Classification Search .................. 454/139, 454/143, 152, 154–155, 338
See application file for complete search history.

(56) References Cited

U.S. PATENT DOCUMENTS

| | | | |
|---|---|---|---|
| 3,748,901 A | 7/1973 | DeBaun | |
| 3,748,997 A * | 7/1973 | Dean et al. | 454/234 |
| 6,116,375 A | 9/2000 | Lorch et al. | |
| 6,974,376 B2 * | 12/2005 | Yamaguchi et al. | 454/146 |
| 2004/0185765 A1 | 9/2004 | Yamaguchi et al. | |
| 2007/0218824 A1 * | 9/2007 | Bailey | 454/139 |
| 2008/0125027 A1 * | 5/2008 | Thawani et al. | 454/195 |

FOREIGN PATENT DOCUMENTS

| | | |
|---|---|---|
| JP | 05-096116 | 4/1993 |
| JP | 2004-268705 | 9/2004 |
| JP | 2005-075139 | 3/2005 |
| JP | 2008-247305 | 10/2008 |
| KR | 10-2004-0065885 | 7/2004 |

OTHER PUBLICATIONS

PCT Search Report dated Nov. 12, 2010 for PCT Application No. PCT/US2010/028652.
Office Action issued Dec. 24, 2012 in corresponding Japanese Application No. 2012-502244 with English translation.

* cited by examiner

*Primary Examiner* — Craig Schneider
*Assistant Examiner* — Atif Chaudry
(74) *Attorney, Agent, or Firm* — Harness, Dickey & Pierce, P.L.C.

(57) ABSTRACT

An apparatus for a heating, ventilating and air conditioning system may include an outer shell and a honeycomb structure. The outer shell may define an interior volume having an inlet and an outlet providing an airflow path therethrough. The honeycomb structure may be attached to the outer shell and disposed in the airflow path. The honeycomb structure may include a plurality of polygonal apertures extending substantially in a direction of the airflow. The honeycomb structure may deflect sound waves away from a predetermined area.

18 Claims, 4 Drawing Sheets

US 8,425,284 B2

HEATING VENTILATION AND AIR CONDITIONING CASE WITH HONEYCOMB

FIELD

The present disclosure relates to a heating, ventilation and air conditioning system and more particularly, to a heating, ventilation and air conditioning system having a case with a honeycomb feature.

BACKGROUND

This section provides background information related to the present disclosure which is not necessarily prior art. Many modern vehicles, such as automobiles, include climate control systems or heating, ventilating and air conditioning (HVAC) systems that operate to heat, ventilate and cool a cabin or passenger compartment of a vehicle. HVAC systems often include a fresh air inlet, a recirculated air inlet, and a motor-driven fan drawing air from one or both of the inlets. The air may be subsequently heated or cooled and discharged into the passenger compartment through one or more of a plurality of vents. Operation of the HVAC system may generate noise, which may adversely affect vehicle occupants' comfort and enjoyment of the vehicle. The present disclosure provides an HVAC system that may reduce noise audible in the passenger compartment while improving or maintaining airflow characteristics and/or other operating conditions throughout the system.

SYSTEM

This section provides a general summary of the disclosure, and is not a comprehensive disclosure of its full scope or all of its features. In one form, the present disclosure provides an apparatus for a heating, ventilating and air conditioning system. The apparatus may include an outer shell and a honeycomb structure. The outer shell may define an interior volume having an inlet and an outlet providing an airflow path therethrough. The honeycomb structure may be attached to the outer shell and disposed in the airflow path. The honeycomb structure may include a plurality of polygonal apertures extending substantially in a direction of the airflow. The honeycomb structure may deflect sound waves away from a predetermined area.

In another form, the present disclosure provides a heating, cooling and ventilation system that may include a fan, a shell, and a honeycomb structure. The fan may be in fluid communication with at least one of a first air inlet and a second air inlet. The shell may at least partially define an airflow path between the fan and the at least one of the first air inlet and second air inlet. The honeycomb structure may be disposed on the shell and may include a plurality of polygonal apertures to allow air to flow therethrough and direct sound waves away from a predetermined area.

In yet another form, the present disclosure provides a vehicle heating, cooling and ventilation system that may include a fan, a motor and a case. The fan may be in fluid communication with a first air inlet and a second air inlet. The motor may drivingly engage the fan. The case may at least partially define an airflow path between the fan and the first and second air inlets. The case may also include a door and a honeycomb structure. The door may be selectively movable to allow and prevent fluid communication between the fan and the first air inlet and between the fan and the second air inlet. The honeycomb structure may include a plurality of hexagonal apertures adapted to direct sound waves away from a predetermined area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
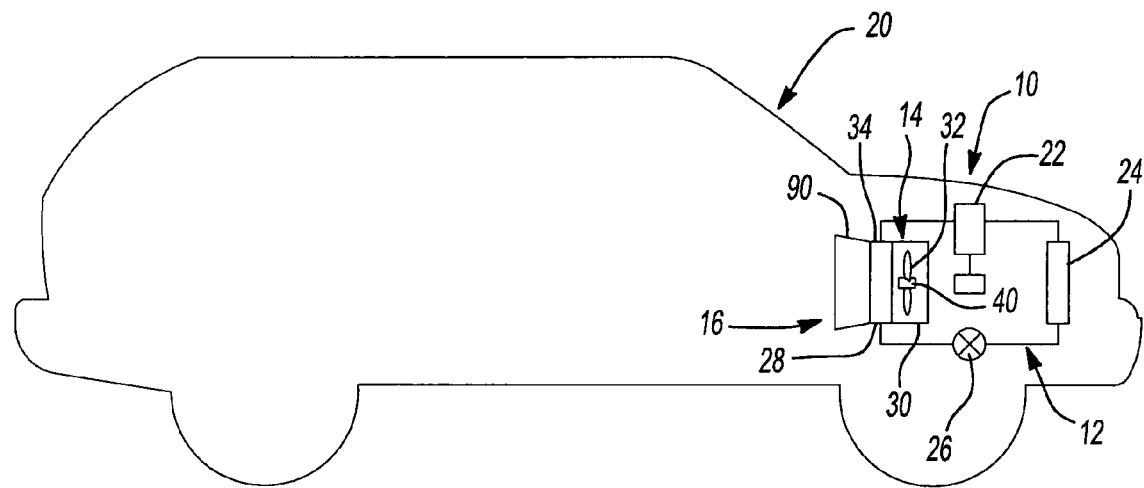
FIG. 1 is a schematic representation of a vehicle having a heating, ventilating and air conditioning system according to the principles of the present disclosure.

Example embodiments will now be described more fully with reference to FIGS. 1-6. A heating, ventilating and air conditioning (HVAC) system 10 is provided and may include a refrigerant circuit 12, a blower assembly 14, and an air distribution assembly 16. The HVAC system 10 may be installed in a vehicle 20 and may be operable to heat, cool or ventilate a cabin or passenger compartment of the vehicle 20.

The refrigerant circuit 12 may include a compressor 22, a condenser 24, an expansion device 26, and an evaporator 28. The compressor 22 may circulate or pump a refrigerant or other fluid through the refrigerant circuit 12. The compressor 22 may draw relatively low pressure fluid, compress the fluid to a relatively higher pressure and discharge the fluid at the relatively high pressure. The compressor 22 can be a reciprocating compressor, a scroll compressor, or a rotary vane compressor, for example, or any other suitable type. The compressor 22 may be driven by an engine or motor of the vehicle 20 via a belt or any other suitable means of transmitting power.

The condenser 24 may include a heat exchanger or coil adapted to receive the high pressure fluid from the compressor 22. The fluid may reject heat to the ambient air as it flows through the coil. It will be appreciated that the condenser 24 could be a gas cooler, a radiator, or any other suitable heat exchanger. The expansion device 26 may be an expansion valve or an orifice tube, for example, adapted to allow the first fluid to expand, thereby lowering the pressure and temperature of the fluid as it flows therethrough. The expansion device 26 may be fluidly coupled with the condenser 24 and evaporator 28.

The evaporator 28 may include a heat exchanger or coil adapted to receive the fluid from the expansion device 26. The fluid may absorb heat from the ambient air as the fluid flows through the coil. The blower assembly 14 may force air across the coil of the evaporator 28 to facilitate heat transfer between the air and the fluid.

Figure 3:
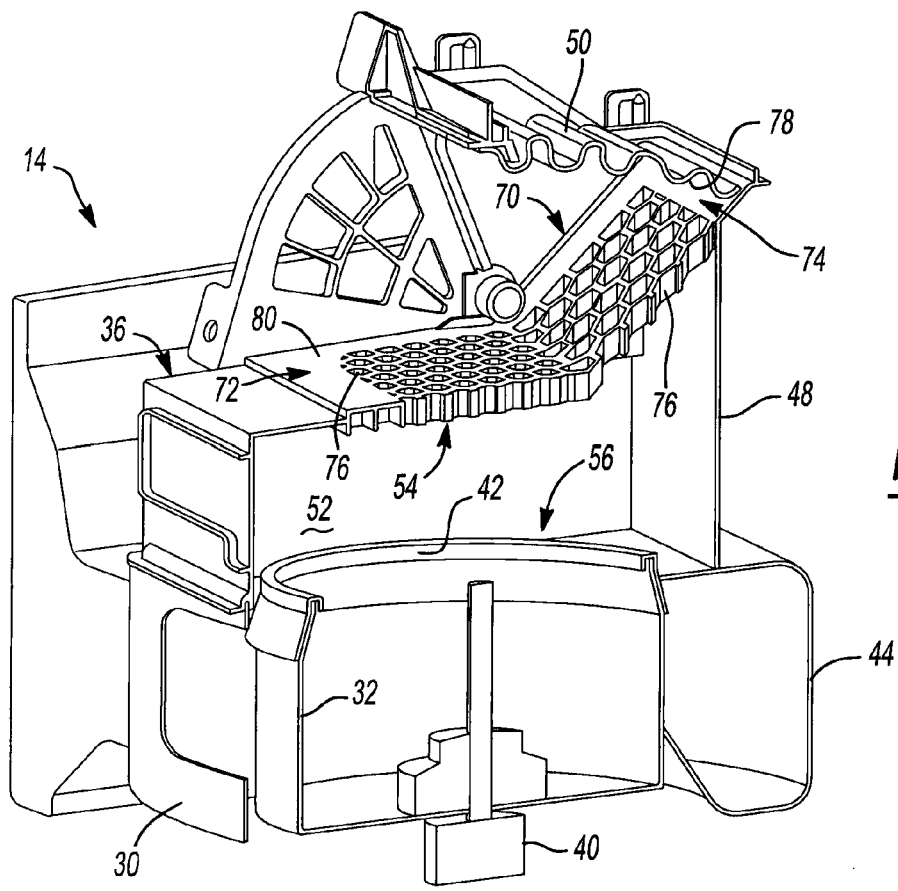
FIG. 3 is a partial perspective view of the blower assembly including a honeycomb structure according to the principles of the present disclosure.

With reference also including FIG. 3, the blower assembly 14 may include a fan housing 30, a fan 32, a duct 34, and an air inlet case 36. The fan 32 may include a plurality of radially disposed fan blades adapted to rotate about an axis of the fan 32 to produce an airflow. An electric fan motor 40 may rotate the fan 32 within the fan housing 30. The fan motor 40 may be powered by a vehicle battery or any other suitable source of vehicle electric current.

The fan housing 30 can be a generally cylindrical enclosure having an inlet 42, which may be disposed along a rotational axis of the fan 32, and an outlet 44, which may be fluidly coupled with the duct 34. The fan housing 30 may at least partially surround the fan 32 and fan motor 40. The duct 34 may be a relatively thin-walled hollow member fluidly coupling the fan housing 30 and the air distribution assembly 16. The evaporator 28 may be disposed at within the airflow path between the fan housing 30 and the air distribution assembly 16. The fan 32 may rotate within the fan housing 30 to produce an airflow which may be channeled through the outlet 44, through the duct 34 and the evaporator 28, and into the air distribution assembly 16, where the air may be subsequently distributed into the passenger compartment of the vehicle 20.

The air inlet case 36 may include a shell 48 and an inlet door 50. The shell 48 may define an interior volume 52, an inlet 54 and an outlet 56. The case 36 may be fixed to the fan housing 30 such that the interior volume 52 is in fluid communication with the fan housing 30 and fan 32. The inlet door 50 may be selectively movable to allow and prevent fluid communication with a fresh air source or inlet 58 and a recirculated air source or inlet 60. The fresh air inlet 58 may be in fluid communication with the exterior of the vehicle 20 and may be adapted to allow the fan 32 to draw in air from outside of the vehicle 20. The recirculated air inlet 60 may be in fluid communication with the passenger compartment of the vehicle 20 and may be adapted to allow the fan 32 to recirculate air from inside of the passenger compartment through the system 10.

A honeycomb structure 70 may be disposed at or proximate to the inlet 54 of the case 36. The honeycomb structure 70 may be integrally formed with the shell 48. Alternatively, the honeycomb structure 70 may be attached to the shell 48 via a snap or interference fitting, adhesive bonding, mechanical fasteners, welding, joining, or any other means or combination of means of securing the honeycomb structure 70 to the shell 48.

The honeycomb structure 70 may include a first substantially planar portion 72 and a second substantially planar portion 74 angled relative to the first portion 72. Either or both of the first and second portions 72, 74 may include a plurality of apertures 76 extending therethrough in a direction substantially parallel to the rotational axis of the fan 32 and/or the direction of airflow into the fan housing 30. The apertures 76 through the first and second portions 72, 74 may be substantially parallel to each other. The plurality of apertures 76 may be hexagonal, for example, or may include any other polygonal, circular or rounded shaped. The plurality of apertures 76 may include a width W and a thickness T, which may be any size suited for a given application. The width W and thickness T may be selected based on one or more factors and/or considerations including, for example, manufacturability, reduction of airflow turbulence through the apertures 76, optimization of airflow volume or flow rate, optimization of other airflow characteristics through the apertures 76, case 36 and/or system 10, prevention of foreign matter intrusion into the system 10, and noise deflection and/or attenuation. For example, the width W may be about 7-10 mm and the depth or thickness T may be about 12 mm. It should be appreciated, however, that the scope of the present disclosure is not limited to such dimensions, as it is contemplated that the width W and thickness T could be smaller or larger than the exemplary values disclosed above.

Figure 4:
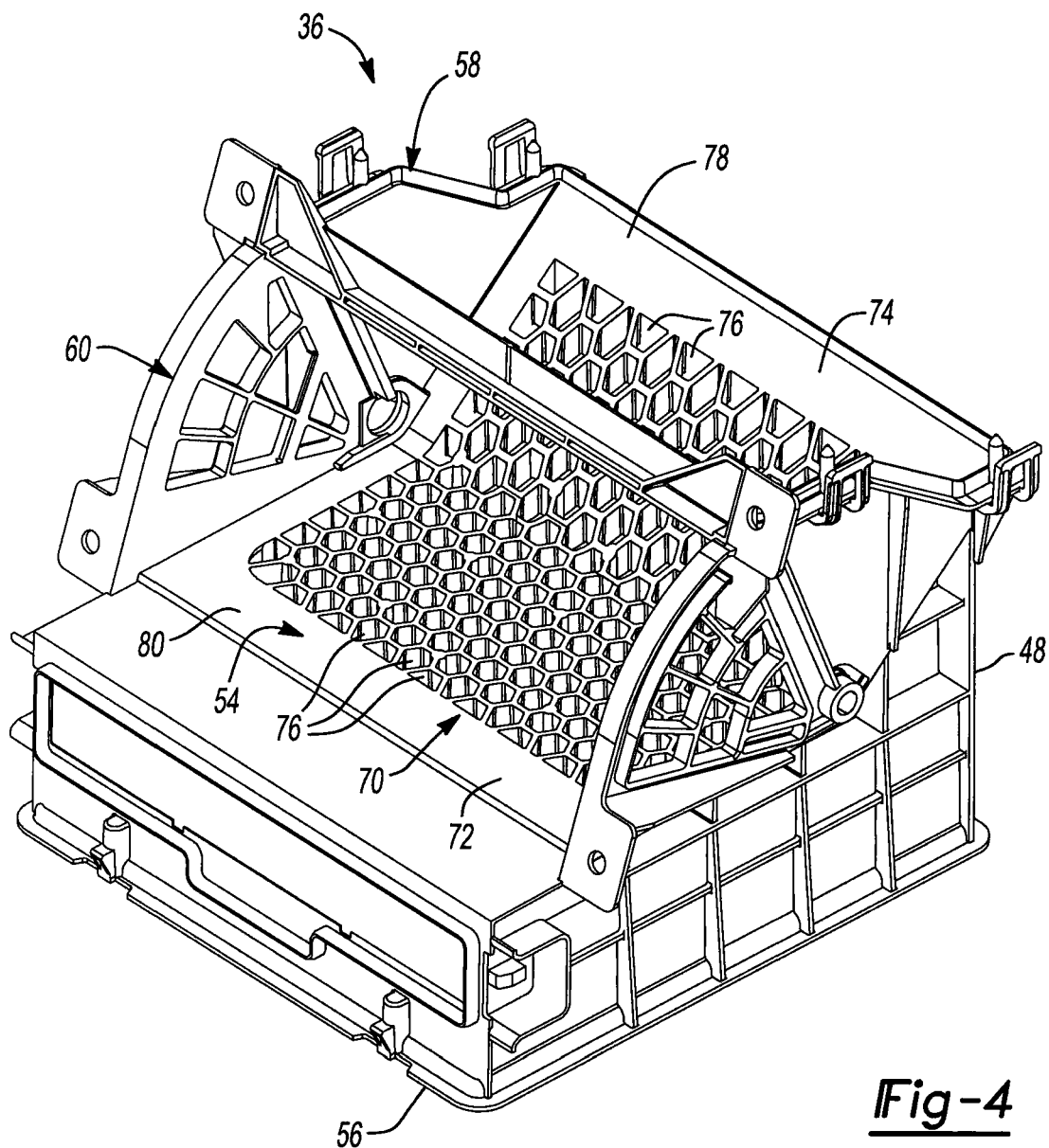
FIG. 4 is a perspective view of an air inlet case having the honeycomb structure according to the principles of the present disclosure.

The first and second planar portions 72, 74 may provide first and second sealing surfaces 78, 80, respectively (FIGS. 3 and 4). The inlet door 50 may be selectively movable into sealing engagement with one of the first and second sealing surfaces 78, 80 to selectively prevent fluid communication between the fan 32 and one of the recirculated air source 60 and fresh air source 58, respectively. The honeycomb structure 70 may provide rigidity and support for the sealing surfaces 78, 80, thereby providing a more uniform and robust seal between the inlet door 50 the sealing surfaces 78, 80. The honeycomb structure 70 forming the apertures 76 may reduce or eliminate a potential for the sealing surfaces 78, 80 to flex or warp while engaging the inlet door 50.

The air inlet case 36 and/or honeycomb structure 70 may be formed from a plastic, foam, aluminum, cloth, an aerogel material and/or any other polymeric or metallic materials. The case 36 and/or honeycomb structure 70 could be manufactured via molding, casting, stamping, machining, laser deposition and/or any other manufacturing process or combination of processes.

Figure 2:
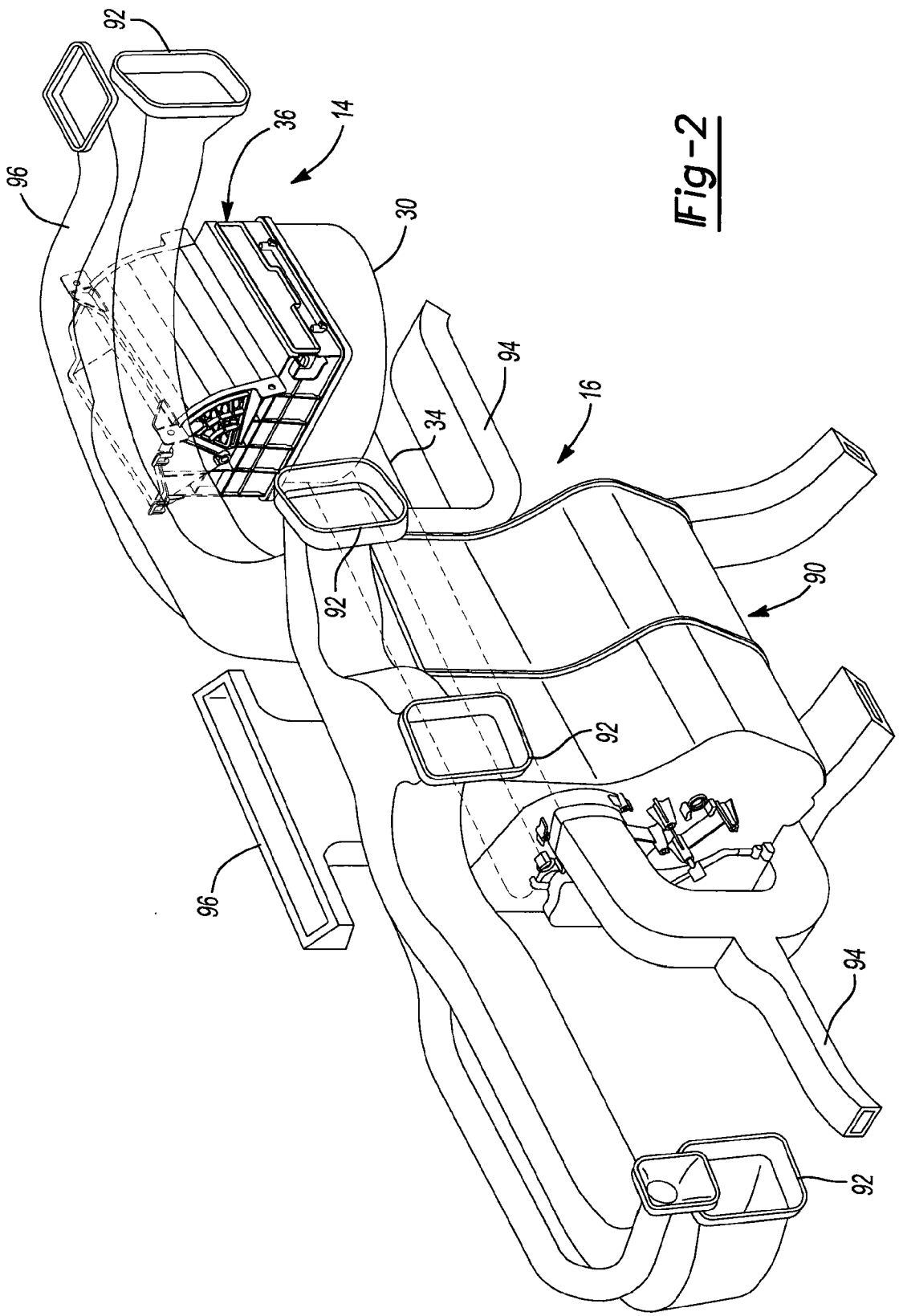
FIG. 2 is a perspective view of a blower assembly and air distribution assembly of the heating, ventilating and air conditioning system of FIG. 1.

Referring now to FIG. 2, the air distribution assembly 16 may include a case 90, one or more face vent ducts 92, one or more foot vent ducts 94, and one or more defrost vent ducts 96. The case 90 may be fluidly coupled with the duct 34 of the blower assembly 14 and may receive air that has been forced across the coil of the evaporator 28 by the fan 32. A heating element may be disposed within the case 90 to selectively heat the air received from the blower assembly 14. The air may be subsequently distributed from the case 90 to the passenger compartment of the vehicle 20 via one or more of the ducts 92, 94, 96.

With reference to FIGS. 1-6, operation of the HVAC system 10 will be described. When the system 10 is in a cooling mode (i.e., when an air conditioning mode is on), the compressor 22 may circulate the refrigerant throughout the refrigerant circuit 12, as described below. When the system 10 is in a heating and/or ventilating mode (i.e., the air conditioning mode is off), the refrigerant circuit 12 may be idle. In any of a cooling, ventilating or heating mode, actuation of the fan motor 40 may cause air to be drawn into the fan housing 30 via at least one of the fresh air inlet 58 and the recirculated air inlet 60.

Upon entering the fresh and/or recirculated air inlets 58, 60, the air may flow through the apertures 76 of the honeycomb structure 70. The depth or thickness T of the apertures may straighten and/or smooth the air flowing therethrough, thereby reducing turbulence and making the airflow more laminar or less noise-producing as it passes through the honeycomb structure 70, and more specifically, the planar portion 72 and a second substantially planar portion 74. The apertures 76 may also reduce or prevent foreign matter from being drawn into the fan housing 30. Such foreign matter may include, for example, tissue, paper, leaves and/or other debris from a glove box 98, the passenger compartment or engine compartment of the vehicle 20.

After passing through the honeycomb structure 70, the fan 32 may force the air through the duct 34, across the evaporator 28 and/or the heating element and into the case 90. From the case 90, the air may be distributed into one or more of the face vent ducts 92, the foot vent ducts 94 and the defrost vent ducts 96, where the air may be subsequently discharged into the passenger compartment of the vehicle 20.

Figure 5:
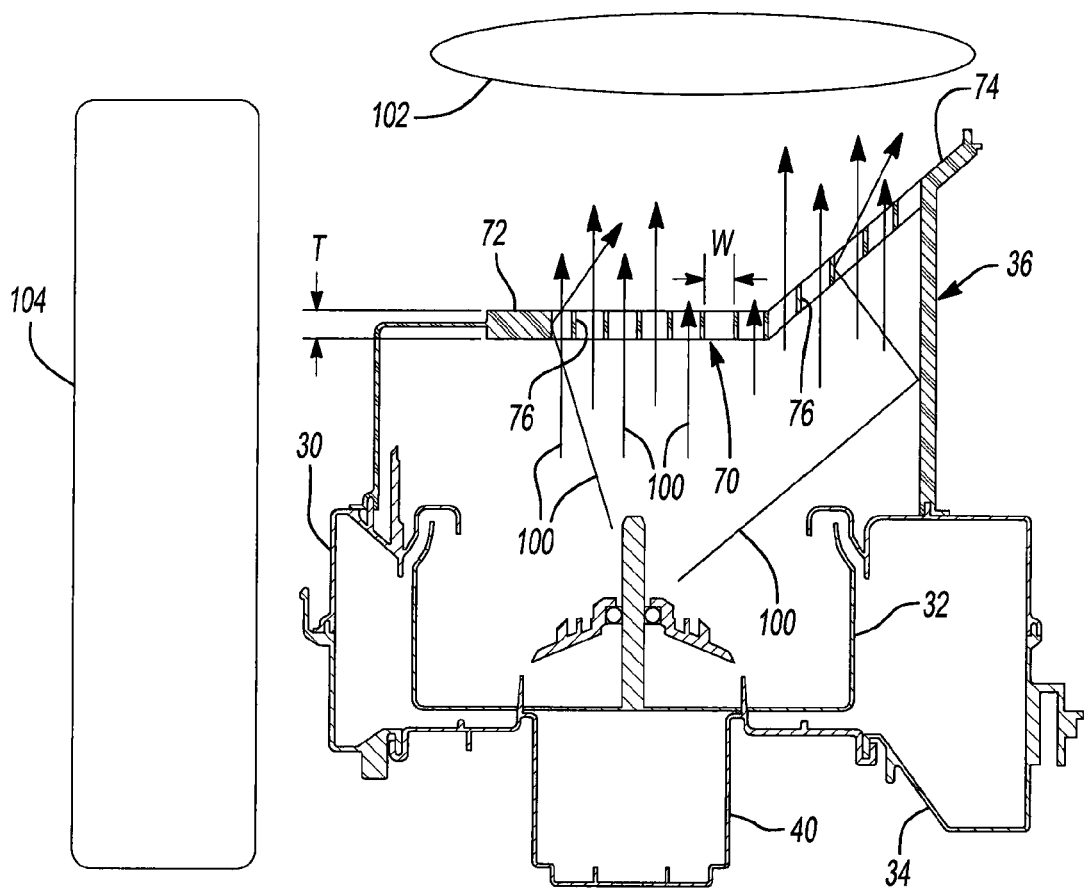
FIG. 5 is a schematic representation the honeycomb structure disposed proximate a fan and fan motor according to the principles of the present disclosure.
Figure 6:
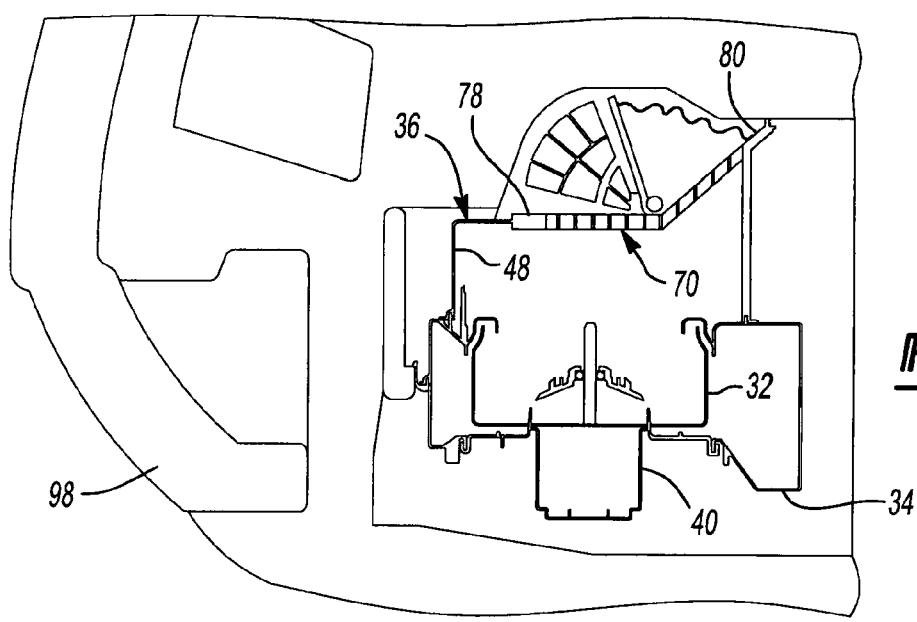
FIG. 6 is a schematic representation of the blower assembly disposed proximate a glove box of the vehicle according to the principles of the present disclosure.

Referring now to FIGS. 5 and 6, the honeycomb structure 70 may reduce the noise level of the system 10 that is audible to the vehicle occupants, thereby increasing the comfort and enjoyment for vehicle occupants. The fan 32 and fan motor 40 may be source of noise in the system 10. The air inlet case 36 may be disposed proximate the glove box 98, and therefore, in relatively close proximity to vehicle occupants in the passenger compartment. Sound waves 100 from the fan 32 and/or fan motor 40 may propagate outward in a plurality of directions.

The shell 48 of the air inlet case 36 and/or the fan housing 30 may attenuate at least a portion of the sound waves, while another portion of the sound waves may exit the case 36 through the inlet 54. The sound waves may pass through the apertures 76 of the honeycomb structure 70. The thickness T of the apertures 76 may channel and/or deflect at least a portion of the sound waves 100 generally upward (relative to the view shown in FIGS. 5 and 6) toward a noise transmission area 102 and away from a noise reduction area 104. For purposes of the present disclosure, the noise transmission area 102 may include at least a portion of the engine compartment, other areas between the engine compartment and the passenger compartment, and/or any other area where drivers and passengers of the vehicle 20 will not ordinarily be situated while driving or riding in the vehicle 20. On the other hand, the noise reduction area 104 may include areas in which drivers and/or passengers may be situated and other areas within the passenger compartment where a reduced noise level is desirable.

The honeycomb structure 70 may improve objective and subjective noise quality within the passenger compartment of the vehicle 20. The honeycomb structure 70 may reduce the level noise of any or all audible frequencies produced by the system 10. Implementation of the honeycomb structure 70 may result in a noise reduction of about 1-2 dB(A) in the noise reduction area 104 without adversely affecting airflow volume or flow rate through the system 10.

It should be appreciated that while the honeycomb structure 70 is described above as being disposed at or proximate to the inlet 54 of the air inlet case 36, additionally or alternatively, the honeycomb structure 70 could be disposed at any other location throughout the HVAC system 10. For example, the honeycomb structure 70 could be disposed at, in, or proximate to any duct, case, inlet, and/or outlet through which air or any other fluid may flow or any other location in which the honeycomb structure 70 may attenuate noise and/or improve fluid flow characteristics.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. An apparatus for a heating, ventilating and air conditioning system comprising:
   an outer shell defining an interior volume having an inlet and an outlet providing an airflow path therethrough; and
   a honeycomb structure attached to the outer shell and disposed in the airflow path, the honeycomb structure including a plurality of polygonal apertures extending substantially in a direction of the airflow, wherein
   the honeycomb structure deflects sound waves away from a predetermined area;
   the honeycomb structure includes a first portion having a first plurality of apertures defining a first plane and a second portion having a second plurality of apertures defining a second plane, wherein the first plane and the second plane are angled relative to each other and are not co-planar; and
   the predetermined area includes at least a portion of a passenger compartment of a vehicle.

2. The apparatus of claim 1, wherein
   the honeycomb structure is adapted to inhibit foreign matter intrusion into the heating, cooling and ventilation system, and
   the plurality of polygonal apertures are hexagonal.

3. The vehicle heating cooling and ventilation system of claim 2, wherein the first and second plane form an angle of less than 180° relative to each other.

4. The apparatus of claim 1, wherein the honeycomb structure and the outer shell are formed from a single piece of material.

5. The apparatus of claim 1, wherein:
   the first plurality of apertures defines a first plurality of central axes, the first plurality of central axes parallel to each other, and
   the second plurality of apertures defines a second plurality of central axes, the second plurality of central axes parallel to each other.

6. The apparatus of claim 1, wherein the inlet is in selective fluid communication with a recirculated air source and a fresh air source.

7. The apparatus of claim 1, wherein each of the plurality of polygonal apertures has a width of between about 7 millimeters and 10 millimeters.

8. The vehicle heating cooling and ventilation system of claim 1, wherein the first and second plane form an angle of less than 180° relative to each other.

9. A heating, cooling and ventilation system comprising:
a fan in fluid communication with at least one of a first air inlet and a second air inlet;
a shell at least partially defining an airflow path between the fan and the at least one of the first air inlet and the second air inlet; and
a honeycomb structure disposed on the shell, the honeycomb structure including a plurality of polygonal apertures allowing air to flow therethrough and direct sound waves away from a predetermined area; wherein
the honeycomb structure includes a first portion having a first plurality of apertures defining a first plane and a second portion having a second plurality of apertures defining a second plane, wherein the first plane and the second plane form an angle of less than 180 degrees relative to each other; and
the predetermined area is a passenger compartment of a vehicle.

10. The system of claim 9, wherein:
the honeycomb structure is adapted to inhibit foreign matter intrusion into the heating, cooling and ventilation system, and
the plurality of polygonal apertures are hexagonal.

11. The system of claim 9, wherein the honeycomb structure and the shell are formed from a single piece of material.

12. The system of claim 11, wherein each of the plurality of polygonal apertures has a width of between about 7 millimeters and 10 millimeters and a depth of about 12 mm.

13. The system of claim 9, wherein:
the first plurality of apertures defines a first plurality of central axes, the first plurality of central axes parallel to each other, and
the second plurality of apertures defines a second plurality of central axes, the second plurality of central axes parallel to each other.

14. The system of claim 13, wherein the first air inlet supplies air from a passenger compartment of a vehicle to the fan, and the second air inlet supplies air from outside of a vehicle to the fan.

15. A vehicle heating, cooling and ventilation system comprising:
a fan in fluid communication with a first air inlet and a second air inlet;
a motor that drives the fan; and
a case at least partially defining an airflow path between the fan and the first and second air inlets, the case including a door and a honeycomb structure, the door being selectively movable to allow and prevent fluid communication between the fan and the first air inlet and between the fan and the second air inlet, wherein
the honeycomb structure includes a plurality of hexagonal apertures adapted to direct sound waves away from a predetermined area; and
the honeycomb structure includes a first portion having a first plurality of apertures defining a first plane and a second portion having a second plurality of apertures defining a second plane, wherein the first plane and the second plane form an angle of less than 180 degrees relative to each other.

16. The vehicle heating cooling and ventilation system of claim 15, wherein each of the plurality of hexagonal apertures has a width between hexagonal faces of between 7 millimeters to 10 millimeters and a depth of about 12 mm.

17. The vehicle heating cooling and ventilation system of claim 16, wherein the predetermined area includes at least a portion of a passenger compartment of the vehicle.

18. The vehicle heating cooling and ventilation system of claim 15, wherein the first and second plane form an angle of less than 180° relative to each other.

* * * * *